| United States Patent [19] | [11] 4,336,629 |
|---|---|
| Jarvis, Jr. et al. | [45] Jun. 29, 1982 |

[54] CASTER SWIVEL LOCK

[75] Inventors: Grover F. Jarvis, Jr., Farmington Hills; George E. Arold, Brownstown, both of Mich.

[73] Assignee: Rose Truck and Caster Company, Detroit, Mich.

[21] Appl. No.: 226,418

[22] Filed: Jan. 19, 1981

[51] Int. Cl.³ .............................................. B60B 33/00
[52] U.S. Cl. .................................................... 16/35 R
[58] Field of Search ................. 16/35 R, 35 D, 44, 18

[56] References Cited

U.S. PATENT DOCUMENTS

| 2,068,160 | 1/1937 | Zeindler | 16/35 R |
| 2,188,648 | 1/1940 | Bouvier et al. | 16/35 R |
| 2,421,464 | 6/1947 | Reiner | 16/35 R |
| 2,422,892 | 6/1947 | Forbes et al. | 16/35 R |
| 2,481,948 | 9/1949 | Pruitt | 16/35 R |
| 3,026,558 | 3/1962 | Mulholland | 16/35 R |
| 4,028,773 | 6/1977 | Morgan | 16/35 R |

Primary Examiner—Doris L. Troutman
Attorney, Agent, or Firm—Barnes, Kisselle, Raisch & Choate

[57] ABSTRACT

A caster swivel lock construction comprising a base, a yoke rotatably mounted on the base for rotation about a vertical axis and having a ring plate and spaced legs extending away from the ring plate, an axle extending between the legs and a wheel rotatably mounted on the axle. The ring plate has one or more radially extending notches therein. A spring loaded plunger assembly is mounted on the base and comprises a body, a plunger movable axially in the body, and a spring associated with the plunger. A foot pad is pivoted to the plunger on the other end and has a cam portion urged by the spring to engage a portion of the body so that the plunger is moved axially inwardly and outwardly by operation of the foot pad. The plunger assembly is removably mounted on the base so that the plunger axis extends radially inwardly toward the ring plate and movement of the foot pad causes the plunger to move radially inwardly and outwardly for engagement and disengagement with a notch. The cam portion of the foot pad has a configuration such that in one position of the foot pad, the one end of the plunger is out of engagement with a notch, and in another position, the one end of the plunger is in engagement with a notch.

18 Claims, 5 Drawing Figures

CASTER SWIVEL LOCK

This invention relates to casters and paticularly to caster swivel locks.

BACKGROUND AND SUMMARY OF THE INVENTION

Casters which are commonly used on wheeled trucks and or transfer systems comprise a base plate, a yoke mounted for rotation on the base plate about a vertical axis with the yoke including a ring plate and spaced legs extending from the ring plate between which an axle is mounted and a wheel rotatably mounted on the axle. In certain uses of the wheeled trucks, it is desirable to lock the wheel in a predetermined circumferential orientation relative to the truck, for example, to cause the truck to move in a straight line or in an arch. Thus, it is common to provide a spring loaded plunger on the base plate which is urged into engagement with a notch or notches on the ring plate. In one type of caster swivel lock that is commercially used, the opposite end of the plunger is held in one of two axial positions by engagement of a cross pin on the plunger with either a shallow slot or a deep slot, the latter position corresponding to the notch engaging position. The operator must bend over and operate the mechanism by manually grasping and turning the plunger. Other similar mechanisms that have been proposed are shown in U.S. Pat. Nos. 1,633,638 and 2,068,160.

A problem with respect to such mechanisms is that in order to repair the lock mechanism, it is necessary to completely disassemble the mechanism or the entire caster and in the process of disassembly of the mechanism, there is a danger that the springs will be released causing injury.

Among the objects of the present invention are to provide a caster swivel lock construction wherein a removably mounted plunger assembly is provided that can be readily removed and replaced without injury; which construction is relatively simple and low in cost; and wherein the plunger assembly can be foot operated or hand operated by a motion of the foot or hand.

In accordance with the invention, the plunger is a part of spring loaded plunger assembly comprising a body, the plunger movable axially in the body, a spring associated with the plunger, a foot pad pivoted to said plunger on the other end and having a cam portion urged by the spring to engage a portion of the body so that the plunger is moved axially inwardly and outwardly by manipulation of the foot pad. The spring plunger assembly is removably mounted on the base plate so that the plunger axis extends radially inwardly toward the ring plate and movement of said foot pad causes said plunger to move radially inwardly and outwardly for engagement and disengagement with a notch. The cam portion has a configuration such that in one position of the foot pad, one end of said plunger is out of engagement with a notch, and in another position, the plunger is in engagement with a notch.

DESCRIPTION

Figure 1:
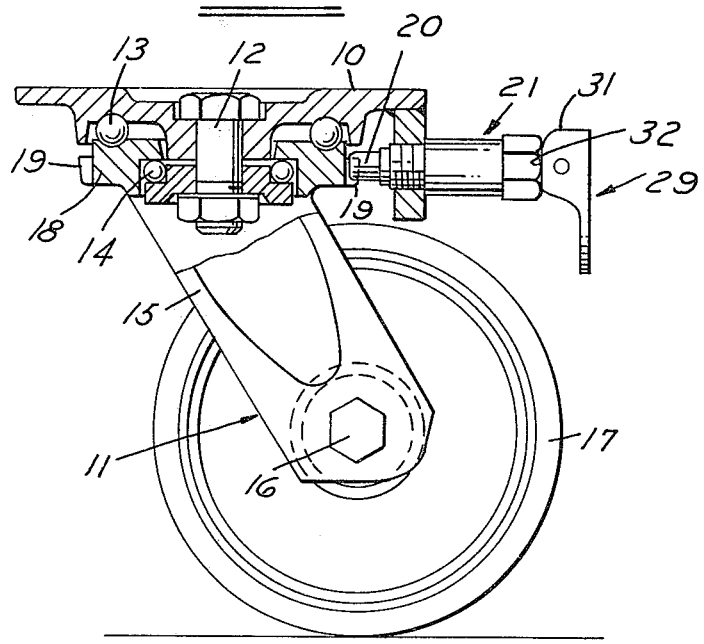
FIG. 1 is a part sectional elevational view of a caster embodying the invention.

Referring to FIG. 1, the caster shown comprises a base 10 and a yoke 11 rotatably mounted on the base by a bolt 12 and ball bearings 13, 14. The construction shown is of well known design and includes legs 15 on the yoke supporting an axle 16 on which a wheel 17 is rotatably mounted.

In accordance with the invention, ring plate 18 of the yoke 11 is formed with a plurality of circumferentially spaced radially extending notches 19 on the periphery thereof that are adapted to be engaged selectively by a plunger 20 that forms parts of a spring loaded plunger assembly 21 to lock the yoke 11 and, in turn, the axis of rotation of the wheel 17 in an oriented angular position with respect to the cart or transfer system on which it is mounted.

The spring loaded plunger assembly 21 includes a cylindrical body 22 that is threaded at its inner end as at 23 into a bracket 24 joined to the base plate 10 as by welding at 25. Alternatively, bracket 24 may be formed integrally with base 10. The plunger 20 is urged outwardly toward the ring plate 18 by a spring 26 interposed between a flange 27 on the plunger 20 and the outer end 28 of the body 22. The outer end of the plunger 20 extends through the end 28 and a foot pad 29 is pivoted thereto by a pin 30. The foot pad 29 is generally U-shaped in cross section and the legs thereof include flat cam surfaces 31, 32 connected by a curved cam surface 33. The pad 29 further includes a tab 34 forming a foot operating portion. Tab 34 can be manipulated by foot or hand.

Figure 2:
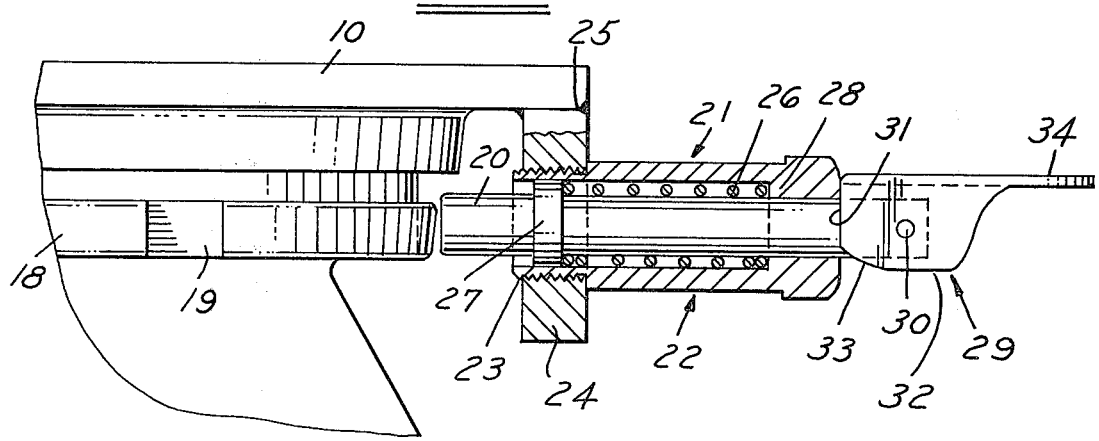
FIG. 2 is a fragmentary side elevational view on an enlarged scale showing the parts in a different operative position.
Figure 3:
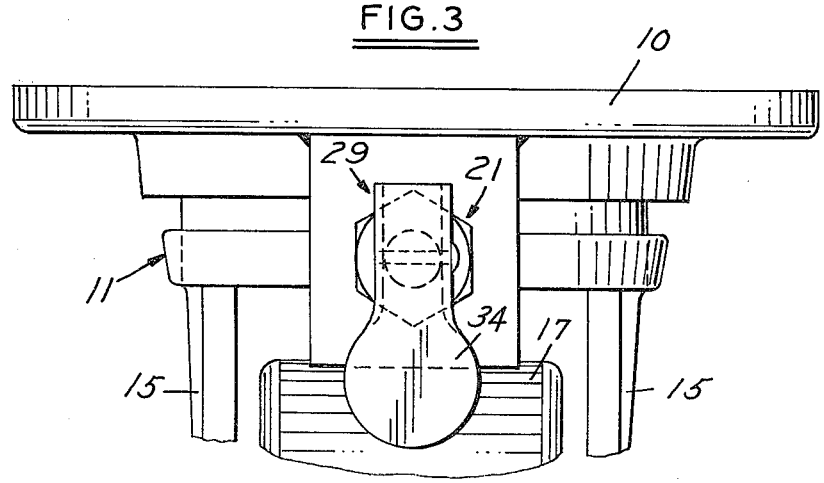
FIG. 3 is a fragmentary side elevational view on an enlarged scale of the caster shown in FIG. 1.

When the foot pad 29 is in the position shown in FIG. 1, the plunger 20 extends inwardly toward one of the notches 19 and the flat portions 32 engage the flat end of body 22. When the tab 34 is lifted to the position shown in FIG. 2, the plunger 20 is retracted and the flat portions 31 of the cam engage the flat end of the body 22 holding the plunger 20 in retracted position. It may be noted that in this position the tab 34 extends horizontally, as shown in FIG. 2, giving a visual indication that the caster is unlocked and permitting locking to occur by just forcing downwardly by the use of the foot.

In the event of damage to the plunger 20, the entire spring loaded plunger assembly 21 is removed by unthreading the body 22 from the bracket 24 permitting replacement without the risk of injury such as might occur if the mechanism or caster had to be disassembled and the spring had to be released in place in the vicinity of the cart or associated system.

It can be appreciated that different size brackets 24 may be required depending upon the size and configuration of the various parts of the caster.

Figure 4:
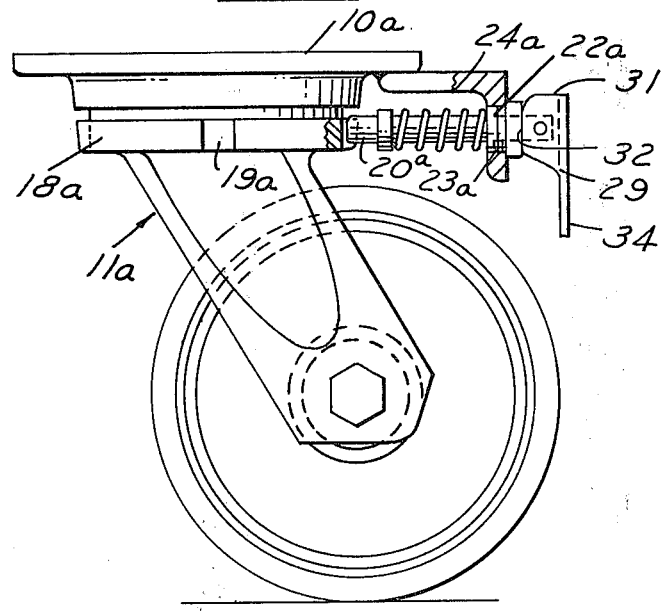
FIG. 4 is a fragmentary sectional view of a modified form of caster.
Figure 5:
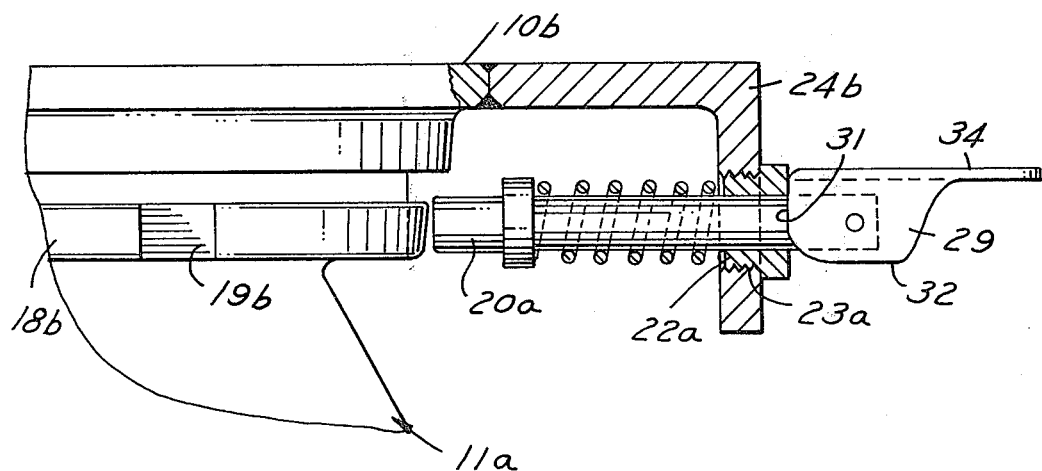
FIG. 5 is a fragmentary sectional view of a further modified form of caster.

A modified form of spring loaded assembly may be used such as shown in FIGS. 4 and 5 wherein the body 22a of the plunger assembly does not enclose the spring and is threaded as at 23a near the foot pad 29. As shown in FIG. 4, the bracket 24a is L-shaped and welded to the underside of the base plate 10a.

As shown in FIG. 5, the bracket 24b is L-shaped and welded to periphery of the base plate 10b.

In each of the forms of the invention, the foot pad 29 is formed with a flat surface 31 that engages the end of the assembly body when the plunger is retracted.

I claim:

1. A caster swivel lock construction comprising
   a base,
   a yoke rotatably mounted on said base for rotation about a vertical axis,
   said yoke having a ring plate and spaced legs extending from the ring plate,
   an axle extending between the legs and a wheel rotatably mounted on said axle,
   said ring plate having at least one radially extending notch in the periphery thereof,
   a spring loaded plunger assembly comprising a body,
   a plunger movable axially in said body,
   a spring associated with said plunger,
   a foot pad pivoted to said plunger on the other end and having a cam portion urged by said spring to engage a portion of said body so that the plunger is moved axially inwardly and outwardly by manipulation of said foot pad,
   means for removably mounting said plunger assembly on said base plate so that the plunger axis extends radially inwardly toward said ring plate and movement of said foot pad causes said plunger to move radially inwardly and outwardly for engagement and disengagement with said notch,
   said cam portion having a configuration such that in one position of said foot pad, said one end of said plunger is out of engagement with said notch, and in another position, said one end of said plunger is in engagement with said notch.

2. The caster swivel lock construction set forth in claim 1 wherein said cam portion of said foot pad includes a flat portion which engages the body when the plunger is out of engagement with the notch thereby holding the plunger firmly in unlocked position.

3. The caster swivel lock construction set forth in claim 2 wherein the foot engaging portion of said pad extends horizontally when said flat portion of said cam engages the body and the plunger is out of locking engagement with the notch.

4. The caster swivel lock construction set forth in claim 1 wherein said means removably mounting said plunger assembly comprises a thread on said body and a complementary thread on said base.

5. The caster swivel lock construction set forth in claim 4 wherein said thread is adjacent the foot pad.

6. The caster swivel lock construction set forth in claim 4 wherein said thread is adjacent the free end of said body.

7. The caster swivel lock construction set forth in claim 6 wherein said body encloses said spring.

8. The caster swivel lock construction set forth in claim 4 wherein said threaded portion of said base comprises a member on said base extending downwardly and having a horizontally threaded opening.

9. The caster swivel lock construction set forth in claim 8 wherein said member includes a horizontal portion joined to said base plate.

10. The caster swivel lock construction set forth in claim 9 wherein said horizontal portion is welded to the underside of said plate.

11. The caster swivel lock construction set forth in claim 9 wherein said horizontal portion is butt welded to said base plate.

12. A caster swivel lock construction comprising
    a base,
    a yoke rotatably mounted on said base for rotation about a vertical axis,
    said yoke having a ring plate and spaced legs extending from said ring plate,
    an axle extending between the legs and a wheel rotatably mounted on said axle,
    said ring plate having a plurality of radially extending notches therein,
    a spring loaded plunger assembly comprising a body,
    a plunger movable axially in said body,
    a spring surrounding said plunger,
    a foot pad pivoted to said plunger on the other end and having a cam portion urged by said spring to engage a portion of said body so that the plunger is moved axially inwardly and outwardly by manipulation of said foot pad,
    threaded means for removably mounting said plunger assembly on said base plate so that the plunger axis extends radially inwardly toward said ring plate and movement of said foot pad causes said plunger to move radially inwardly and outwardly for engagement and disengagement with a notch,
    said cam portion having a configuration such that in one position of said foot pad, said one end of said plunger is out of engagement with a notch, and in another position, said one end of said plunger is in engagement with a notch,
    said cam portion of said foot pad including a flat portion which engages the body when the plunger is out of engagement with the notch thereby holding the plunger firmly in unlocked position,
    said foot engaging portion of said pad extending horizontally when said flat portion of said cam engages the body and the plunger is out of locking engagement with the notch.

13. The caster swivel lock construction set forth in claim 12 wherein said thread is adjacent the free end of said body.

14. The caster swivel lock construction set forth in claim 12 wherein said thread is adjacent the foot pad.

15. The caster swivel lock construction set forth in claim 12 wherein said body encloses said spring.

16. The caster swivel lock set forth in claim 12 wherein said foot pad includes a second flat portion which engages the body when the plunger is in engagement with a notch.

17. A caster swivel lock construction comprising
    a base,
    a yoke rotatably mounted on said base for rotation about a vertical axis,
    said yoke having a ring plate and spaced legs extending from the ring plate,
    an axle extending between the legs and a wheel rotatably mounted on said axle,
    said ring plate having at least one radially extending notch in the periphery thereof,
    a plunger assembly comprising a body,
    means for removably mounting said plunger assembly on said base,
    said plunger assembly including a plunger movable toward and away from said notches when said assembly is mounted on said base plate and including means for causing said plunger to be moved into and out of engagement with said notch.

18. The caster swivel lock construction set forth in claim 17 wherein said means removably mounting said plunger comprises a thread on said body and a complementary thread on said base.

* * * * *